Dec. 27, 1966 R. O. BROWN 3,293,939
VIBRATION ELIMINATORS
Filed Sept. 13, 1963
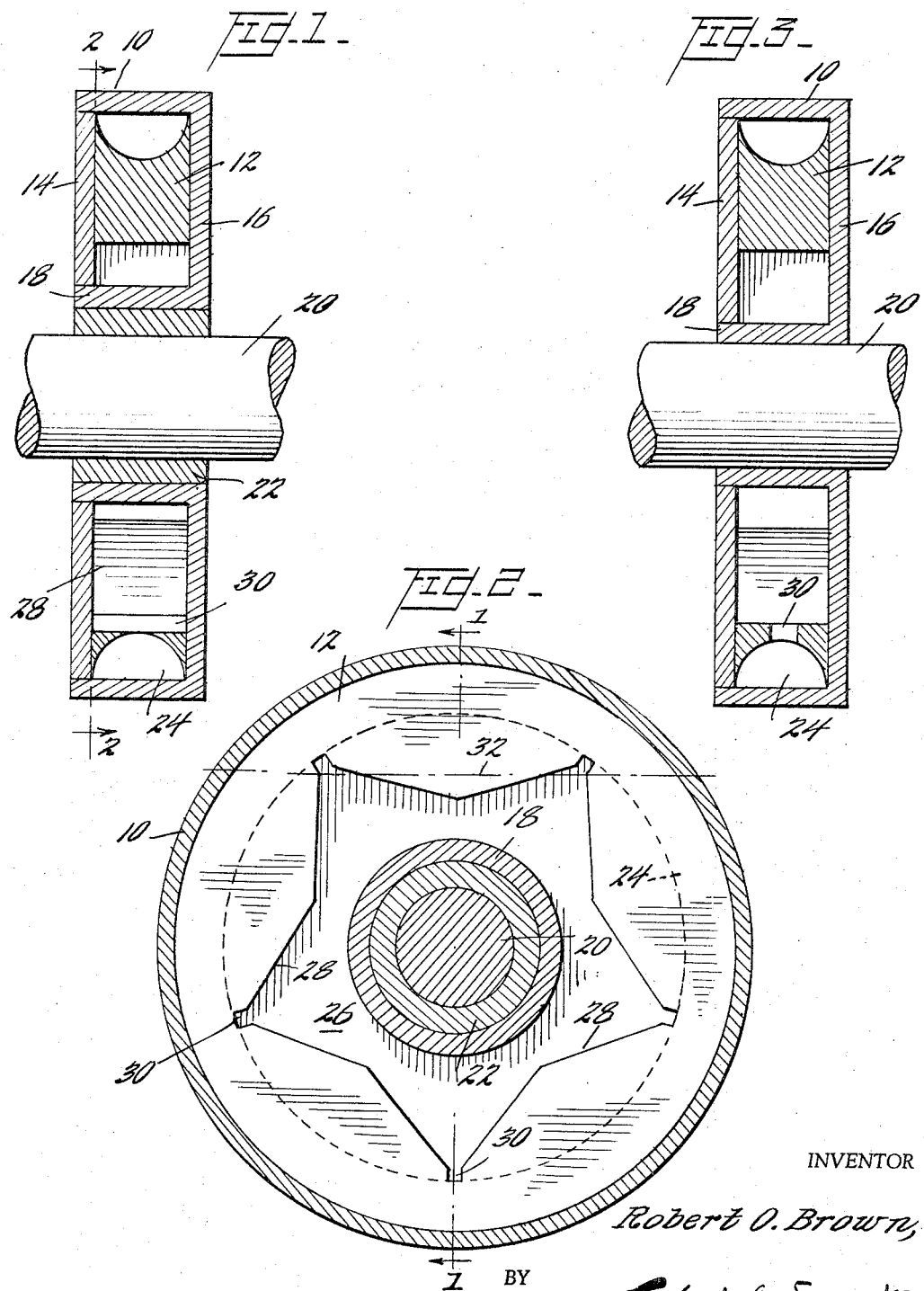
INVENTOR
Robert O. Brown,
BY
Robert A. Lavender
ATTORNEY 3,293,939
VIBRATION ELIMINATORS
Robert O. Brown, Rte. 2, Box 262,
Smithsburg, Md. 21783
Filed Sept. 13, 1963, Ser. No. 308,797
2 Claims. (Cl. 74—574)

This invention relates to vibration eliminators and more particularly to such eliminators that are automatic in operation.

Industry has been faced for many years with the destructive effects of vibration in assemblies of rotating machine parts. These vibrations arise when the geometric axes of a rotating unit, such as a shaft and its attachments, does not coincide with one of its principal axis of inertia through its center of gravity.

Under these conditions of imbalance, the mass of the shaft, which may be considered as being concentrated as a whole in the center of gravity of the shaft, sets up centrifugal forces that must be absorbed.

The invention disclosed herein will be described as applying to a shaft, but it will be understood that the shaft will be considered as including any attachments thereto, such as fly wheels, gears or pullies.

If the shaft is long and flexible, the centrifugal forces set up by the imbalance will be absorbed by the shaft, which will become wobbly as it is held firmly in its bearings. If the shaft is short and stiff, the forces will be absorbed by the bearings and their supports. In the former case the metal in the shaft rapidly crystallizes under continued fatigue stress and in the latter case the bearings must be renewed frequently.

In some cases the vibrations of a shaft may be reduced by dynamically balancing the attachments thereto before these attachments have been secured to the shaft. However, this procedure does not eliminate any residual imbalance; it merely reduces the amount of vibration forces.

Several devices for the elimination of vibrations in rotating bodies have been disclosed in the prior art. Typical of these are the disclosures in U.S. Patent 2,778,243, issued to Darrieus and in U.S. Patent 1,159,052 issued to Leblanc.

In the Darrieus patent, oil under pressure for lubricating a bearing is fed through enlarged sections of the bearing into supply chambers, through suitably calibrated bores and a plurality of longitudinal and radial ducts into enlarged arcuate bores in a rotor, the volume of oil delivered to the arcuate bores forcing metal balls therein into balancing positions.

In the Leblanc patent, a rim is shrunk on a flywheel to form a circular channel into which mercury and vaseline are placed. In the channel is a plurality of transverse sheet dampers or partitions in which are drilled a set of small holes for the passage of the mercury and a set of large holes for the passage of the vaseline.

The principal object of the invention is to provide a vibration eliminator that prevents the occurrence of vibrations in a rotating shaft in which an imbalance exists by moving a liqiud mass within the eliminator to such positions as to compensate for such imbalance.

Another object of the invention is to provide a vibration eliminator that automatically corrects the effect of any imbalance in a rotating unit.

Another object of the invention is to provide a vibration eliminator that is simple in design, is simple and cheap to manufacture.

Another object of the invention is to provide a vibration eliminator that is self-contained and requires no adjustments or maintenance.

Another object of the invention is to provide a vibration eliminator that is universal in its assembly with rotating shafts of different diameters.

Another object of the invention is to provide a vibration eliminator that automatically compensates for unpredictable and varying causes of vibrations in rotating bodies.

Another object of the invention is to provide a vibration eliminator having spaces in the eliminator in which a liquid may be placed and in which spaces the liquid is free to move under the dynamic forces set up by imbalance, the liquid collecting in the spaces in positions such that the combination of the shaft or rotating body to which the eliminator is attached and the eliminator is in dynamic equilibrium.

Other objects and advantages of the invention will be apparent from the detailed description of the invention set forth herein and from the accompanying drawing made a part hereof in which:

FIGURE 1 is a side cross section view of one embodiment of the invention showing the vibration eliminator that includes a universal adapter installed on a shaft;

FIGURE 2 is a cross section taken on line 2—2 on FIGURE 1; and

FIGURE 3 is a side cross section view of a modification of the invention shown in FIGURE 1, in which modification the eliminator is secured directly on a shaft.

Referring particularly to FIGURES 1 and 2, there are but three parts that make up the eliminator of the invention: the housing shown generally at 10; the core shown generally at 12; and the cover shown generally at 14.

The housing consists of a cylinder closed at one end and open at the other end as at 16 to receive the cover 14. The inner side walls of the housing 10 is of a universal diameter, that is, the diameter is somewhat larger than the diameter of the shafts to which the eliminator is generally applied that the same size eliminator may be used on shafts over a range of several sizes, by the use of adapters of different thicknesses. The adapter illustrated in the present embodiment is shown at 22.

The core 12 is of the general form of a flat disc having a groove 24 formed in the rim thereof. The central portion of the core is hollow, except for the inner walls 18. Pockets 26 are formed by further hollowing out the interior of the eliminator. Walls 28 of the pockets 26 converge into orifices or openings 30. These orifices connect the interior portion of core 12 with the groove 24 at the root thereof. Orifices 30 may be in the form of slits as shown in FIGURE 1 or may be round in shape or in other shapes.

While five orifices and pockets are shown in the present embodiment, three or more pockets and orifices may be utilized, as long as they are symmetrically arranged.

While the core 12 is shown in the general form of a single flat disc, it is apparent that the core may be made in sections and assembled as a unit.

The cover 14 fits in sealed and leak-proof relation into the outer walls of housing 10 and the inner side walls of the housing and in frictional engagement with one face of core 12. The other face of core 12 is in frictional engagement with the back wall of the housing.

In assembling the vibration eliminator, the housing is placed flat on a surface with its open end up. The core 12 is then placed in the housing. A quantity of a liquid such as mercury, oil, Prestone or other liquid, is placed in the housing and the cover 14 is placed in sealing relation with the open ends of the side walls of the housing. The amount of liquid placed in the housing is such that when the eliminator is turned so that the flat side thereof is vertical, the level of the liquid is approximately at the level indicated by the dash-dot line 32.

When the eliminator is mounted on a shaft or other rotating body and the shaft is not rotating, the liquid in the groove and the pockets seeks the lower parts of these spaces. When the shaft rotates and there is no tendency for the shaft to vibrate, the liquid is distributed uniformly by centrifugal forces. When the shaft reaches a rotational speed at which there is an imbalance, the inertia forces acting on the liquid moves the liquid into such distributions in the groove and the pockets that the dynamic equilibrium of the shaft and the eliminator as a unit is established and there is no further tendency for the shaft to vibrate.

It is obvious that the invention has been described and illustrated only by way of example and various modifications can be made thereon without departing from the scope of the invention as defined in the appended claims.

I claim:

1. A vibration eliminator for rotating bodies having a circular outer channel, a central hub member, a web-like portion connecting said hub member and said channel and having peripherally spaced dividing members, said hub member and said dividing members defining a liquid supply chamber, the spaces between said dividing members serving as passages connecting said circular outer channel and said chamber, and providing a controlled flow of liquid between said chamber and said outer channel by gravity or by centrifugal force.

2. Apparatus of the type described in claim 1 in which said web-like portion has holes for attachment to a rotatable body.

References Cited by the Examiner

UNITED STATES PATENTS

| | | | |
|---|---|---|---|
| 394,407 | 12/1888 | Sibley et al. | 287—52.04 |
| 2,403,478 | 7/1946 | Burnat | 74—574 |
| 2,819,069 | 1/1958 | Isom | 74—574 |

FRED C. MATTERN, JR., *Primary Examiner.*

BROUGHTON G. DURHAM, *Examiner.*

W. S. RATLIFF, *Assistant Examiner.*